Jan. 7, 1969   M. H. GLEN ET AL   3,420,275
CONDUIT CLOSER AND POSITIONER
Filed March 10, 1965   Sheet 1 of 2
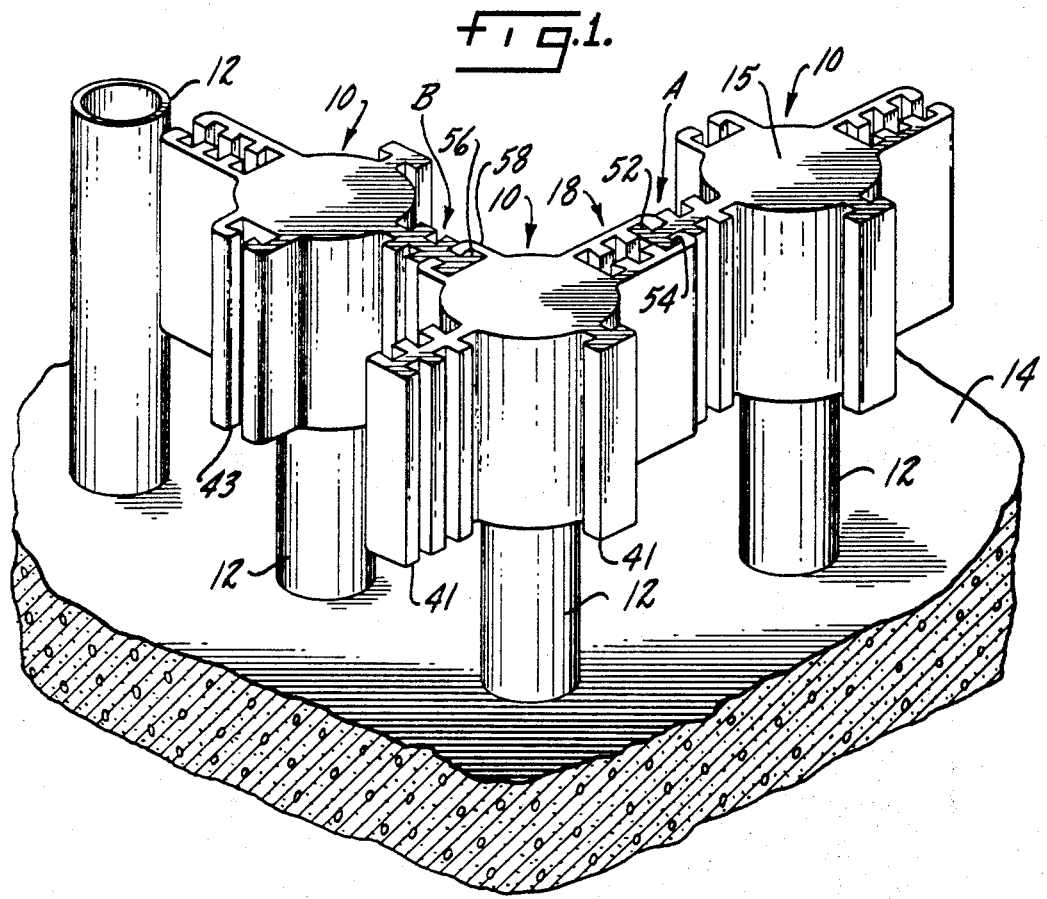
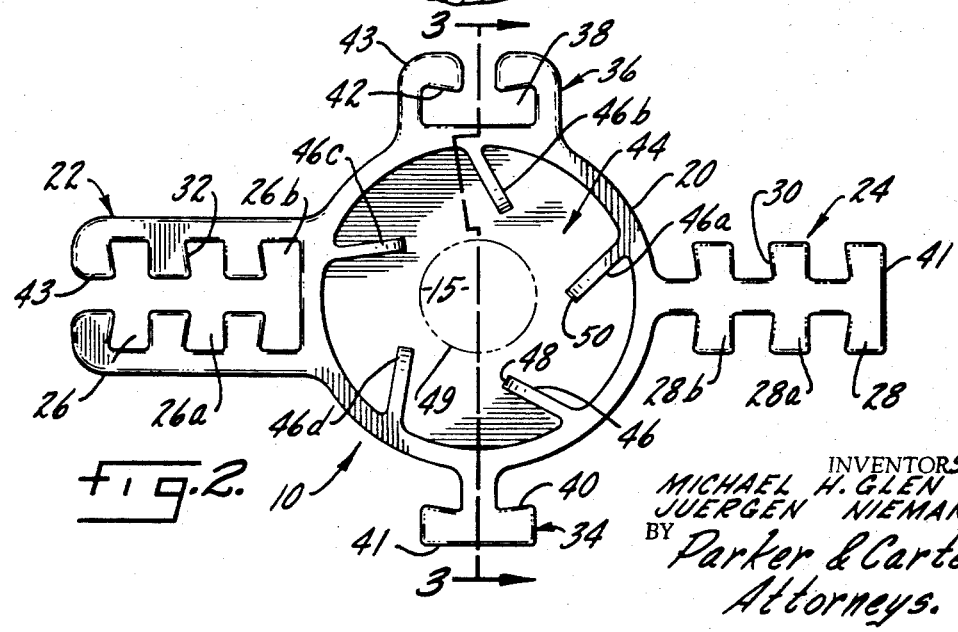
INVENTORS.
MICHAEL H. GLEN
JUERGEN NIEMANN
BY Parker & Carter
Attorneys.

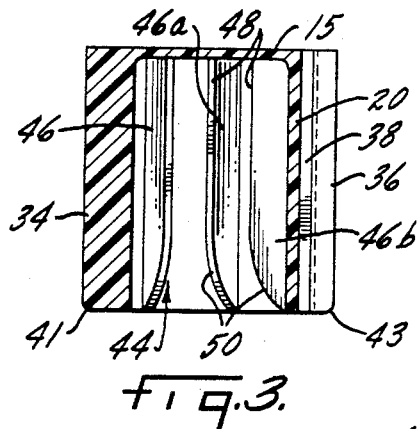
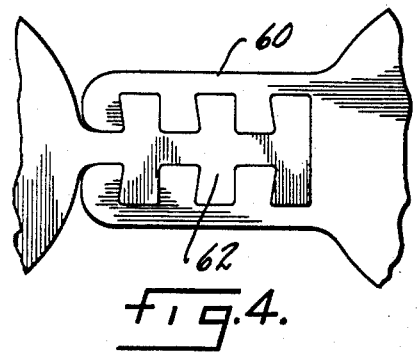
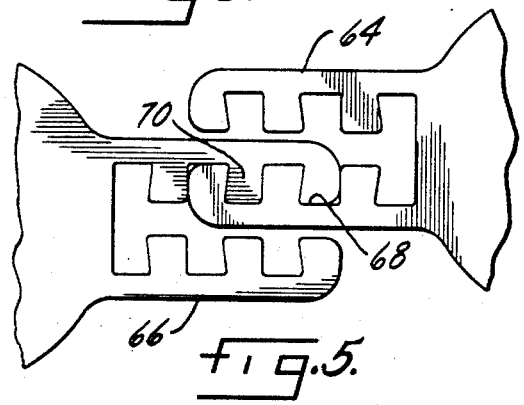
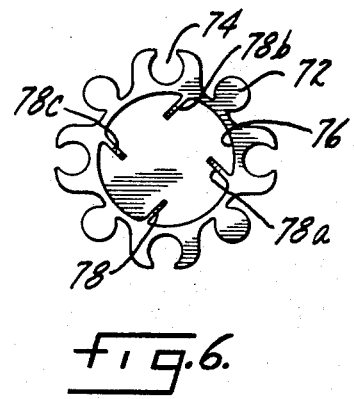
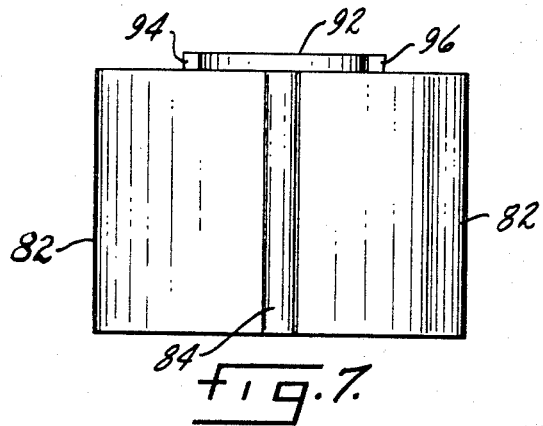
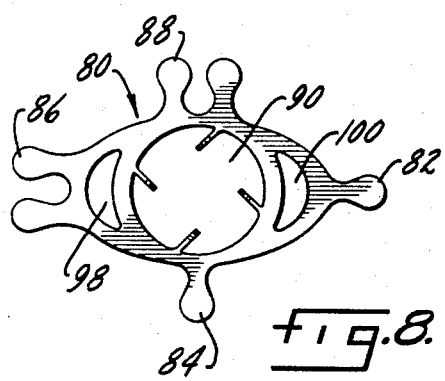
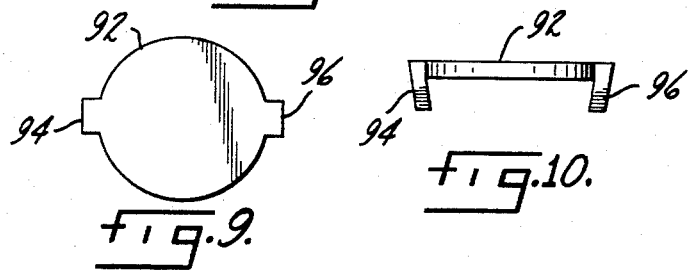
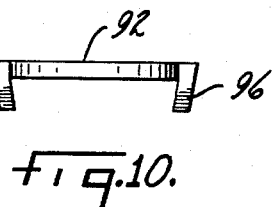

United States Patent Office 3,420,275
Patented Jan. 7, 1969

3,420,275
CONDUIT CLOSER AND POSITIONER
Michael H. Glen and Juergen Niemann, Sycamore, Ill., assignors to Ideal Industries, Inc., Sycamore, Ill., a corporation of Delaware
Filed Mar. 10, 1965, Ser. No. 438,658
U.S. Cl. 138—96        1 Claim
Int. Cl. B65d 59/00

This invention relates to a conduit installation aid and is concerned with a device to space and position conduits, especially construction project conduits which are used to receive and house electrical conductors, such as wiring, cables and the like.

A primary object of this invention is an interlocking unit for spacing conduit which can be used to snugly accommodate conduits with various outside diameters.

Another object is a unit for positioning and closing a conduit which unit has a passageway in which a varying number of resilient means are yieldable to accommodate conduits with various outside diameters.

Another object is a unit for positioning conduits in which external configurations are integrally formed so that one unit may be locked to another like unit in a variety of spaced positions, elevations and planes relative to each other without requiring additional locking means or differently designed units.

Another object is a unit for positioning and closing the end of conduits which has a passageway to receive an end of the conduit and is integrally formed with a closure for one end of the passageway, and integrally formed with multiple external locking configurations to provide adjustable positioning of the units in various elevations and planes.

Another object is a unit for spacing and positioning conduit which unit has external locking configurations on the opposed sides of a body section in the form of slots and coacting slides in a selected single or repeating pattern so that versatility in spacing is obtained.

Another object is a conduit installation aid which is much easier to install on conduit.

Another object is a conduit installation aid which slides on easy at first and provides a tight interlock when fully seated on conduit.

Another object is a conduit closure which can be used for either rigid conduit or tubing with different outside diameters for any one nominal conduit size.

Another object is a conduit installation aid which provides for quick and simple spacing adjustment or center-to-center distances between conduit.

Another object is an all-plastic installation aid which is simple to mold.

Another object is an interlock between the conduit closures which will resist substantial radial loads.

Another object is an interlock between conduit closures which facilitates quick mounting.

Another object is an interlock of the above type which has maximum flexibility.

Another object is an all-plastic conduit cover with an internal structure for floating the cover on the conduit, providing a sufficiently rigid interlock when the cover is fully seated.

Another object is an aid of the above type which allows a variable friction fit with tubes or pipes of the same nominal size.

Another object is a conduit installation aid of the above type which can be used to interconnect different pipe or tubing sizes.

Another object is a conduit closure of the above type which does not have to be accurately sized to standard conduit.

Another object is a conduit closure of the above type which does not require an internal taper other than conventional molding draft.

Another object is a closure of the above type which provides maximum reuse due to a floating fit between the closure and the conduit.

Another object is a closure of the above type which can be easily removed.

These objects are attained along with other objects which will become apparent from the following disclosure which includes drawings wherein:

FIGURE 1 is a perspective of several conduit covers in place after pouring concrete;

FIGURE 2 is a bottom plan view of a unit such as shown in FIGURE 1;

FIGURE 3 is a section along line 3—3 of FIGURE 2;

FIGURE 4 is a plan view, with parts removed, of an interlock between adjoining units;

FIGURE 5 is a plan view, similar to FIGURE 4, of a modified or offset interlock;

FIGURE 6 is a bottom plan view of another unit with alternative external locking configurations;

FIGURE 7 is a side elevational view of an alternative embodiment with removable cap;

FIGURE 8 is a top plan view of the unit shown in FIGURE 7 without a cap;

FIGURE 9 is a top plan view of the removable cap for the conduit spacer of FIGURES 7 and 8; and FIGURE 10 is a side elevational view of the cap shown in FIGURE 9.

A plurality of units, such as at 10 in FIGURE 1, may be seen spacing and positioning conduits, such as at 12, as they would appear both before and after the pouring of the construction material, such as a concrete floor 14. These units are shown covering the conduit by a closure end wall 15. The units are shown adjustably interlocked to one another, as at 18.

The unit may be variously shaped and a circular contour as seen in FIGURE 2. The unit has a body section shown generally as a continuous side wall or tube 20.

The side wall has external locking configurations extending from four generally equally spaced positions. A female locking member or locking half 22 is shown 180° away from a coacting locking male member or lug 24. The female lug has dovetail slots 26, 26a and 26b. A male member from a like unit is adapted to register with the female member. Such male member will have dovetail slides such as 28, 28a and 28b. The slides are shown with a reverse angle or undercut, such as at 30, which coacts with a like undercut, such as at 32 in the slots. Such a reverse angle on the hook-up lugs resists opening of the female member when a radial force is applied generally along the axis of the female lug. Locking members, such as 22 and 24, permit selective, spatial positioning of one unit to another. In this embodiment, the sides, which are generally 90° away from members 22 and 24, have a single male lug or slide 34 and a single female member 36 with slot 38. The slide and slot are similarly undercut as at 40 and 42. The corners and edges of the male lugs and female slots are rounded at the bottom in all vertical planes such as 41 and 43 in FIGURE 1, which facilitate engagement of the slide with a matching slot.

The body section has a passageway 44 which extends through the length of the body section up to integrally formed closure or end wall 15. The passageway is shown as substantially circular which shape is formed by the continuous curved wall 20. The diameter of the passageway is preferably selected to receive a tube or conduit of predetermined nominal size but means are provided to accommodate tubes or conduits which have different outside diameters.

Such means are shown as resilient ribs, vanes or fins 46, 46a, 46b, 46c and 46d. The ribs are connected to the curved wall and extend towards the interior or central portion of the passageway. It will be seen that such ribs are radially misaligned by which is meant that the inner edges, such as 48, of the rib do not coincide with any radius of the circular passageway. Such ribs form an angle with the curved wall and all the ribs form an angle to substantially the same degree and substantially in the same general direction relative to the curved wall. Thus, they may be considered generally tangent to a given base circle 49. In referring to the ribs being turned in the same general direction relative to the curved wall, it is meant that all the ribs are turned in either a clockwise or counterclockwise position. In the present embodiment, the ribs are turned clockwise relative to the curved wall so that the natural clockwise twist of right-handed people, which most of us are, finds a natural response when the cap is put on and twisted. But it could be the other way. The disposition of the rib enhances the yield of the ribs in accommodating a conduit having a variable outside diameter within a given nominal size. It is preferred that such ribs be formed integrally with the curved wall 20 of the body section from a material of semi-rigid plastic. The thickness of such ribs should be sufficiently thin so that the ribs appropriately yield to accommodate a larger conduit or tubing, and the ribs should be sufficiently resilient so as to remain snugly positioned against an inserted conduit. The bottom corners of such ribs are preferably rounded as at 50 to form lead-in radii for easier mounting on a conduit.

The external locking configurations may be formed to adjustably space the distance between a pair of similar units which are locked together. The multiple slots on member 22 and multiple matching slides on member 24 may be considered as presenting a repeating locking pattern. Referring to FIGURE 1, a pair of like units may be locked together at a selected spatial distance by engaging one of the slides, such as 52, in an outermost guide slot, such as 54, or a similar slide 56 may engage the single female member 58. Other selective positioning may be obtained as illustrated in FIGURES 4 and 5. A female member 60 and a male member 62 are shown with all the slots and slides on the respective members locked.

An offset interlock may also be obtained by engaging one female member 64 with another female member 66, as in FIGURE 5. Here the spacing, such as 68, functions as a slot and projections, such as 70, serve as a slide or vice versa. This can be used to space, lock and close laterally offset conduit.

Another form is shown in FIGURE 6 wherein a circular shaped slide, such as 72, alternates with a matching slot, such as 74, around the body section. The curved, continuous wall 76 is shown with four ribs 78, 78a, 78b, and 78c. It will be apparent that the number of interior ribs may be varied although a minimum of three ribs should be provided.

Referring to the forms in FIGURES 7 through 10, a body section 80 is shown as being a generally elliptical shape. An end and adjoining side of the body section are shown with male members or slides 82 and 84. The other end and adjoining side are shown with matching female members 86 and 88. In this form, a passageway 90 extends the length of the body section and is open at both ends. One open end may be covered or closed by a removable closure or cap 92 with arcuate legs or lugs 94 and 96 dimensioned and shaped to extend into arcuate openings 98 and 100 of the body member. These openings preferably extend the full length of the body section and are open at both ends. In this way, either end of the unit may be the top or bottom.

The use and operation of my invention are as follows:

Conduit or tubing is desirably spaced and rigidly positioned in construction projects by means such as the disclosed units. The ends of such conduits should be covered by some sort of closure to prevent foreign material from entering the conduits. In this way, a multiple number of conduits can be spaced, positioned and covered before and during concrete pouring, for example. Electrical conductors, such as wiring or cables, can be present in the conduits or can be inserted following a certain step of the construction project.

The disclosed units provide great versatility and convenience in positioning multiple conduits in varying center-to-center positions and at various selected spatial distances. The units have a central passageway which is dimensioned for selected nominal size tubing or pipe and such passageways are equipped with the flexible and resilient ribs which are radially misaligned to acommodate varying outside diameters. A number of such units may be connected together in a variety of ways and in an adjusted spatial distance by providing a variety of external locking configurations.

It is clear that the body section of the unit may take a variety of shapes, and the external configurations may also take a variety of shapes at different sides of the body section.

A slide-slot arrangement is a convenient locking configuration and such slide-slots may be variously shaped, such as dovetail, T-shape, round and the like. The locking slides may be on one side and the locking slots on another side of the body section, both may be on the same side, they may be alternated around the body section, etc. When speaking of the external configurations being on a side of the body section, it is understood that they may also be on the corners. There are a number of variations which are possible which will be readily appreciated in order to enjoy the advantages of versatility provided by the multiple locking and external configurations. With such a disposition of locking configurations, it is possible to select a particular center-to-center spacing of adjoining tubes, pipes or conduits. For instance, relative to a given point, they may be laterally spaced, front and back spaced, obliquely spaced and the like. In other words, the units may all lie in a common plane or in a number of intersecting planes. Since the external configurations preferably run the length of the body section, it is also possible to connect the units at different elevations, one unit may be raised relative to an adjoining unit, or lowered, or on the same level as may be desired.

It is possible to obtain a number of different spaces with the unit of FIGURES 1 and 2. For example, the outer slide and slot of forms 22 and 24 may be connected, thereby providing the maximum spacing, as at A in FIGURE 1. Or two or three such slides and slots may be overlapped, such as in FIGURE 4. Or the other slide and slot may be cut off by the electrician. Or the slide and slot forms 34 and 36 may be interlocked to thereby provide the minimum spacing. Also, these may be alternated. For example, the single slot 36 may interlock with the outer slide 28, as at B in FIGURE 1.

While the FIGURE 5 arrangement has been shown as two slot forms 22 interconnected, it should be understood that this can be done with two of the single slide forms 36.

It should also be understood that the upper ends of the diehedral ribs 48 are integrally molded into the top or end wall 15. Thus, as the cover is slid down over a conduit, the ribs will deflect outwardly somewhat. But as the top of the conduit approaches the end wall 15 of the cap—meaning that the cap is almost fully seated— the integral connection with the end wall will cause the ribs to resist deflection. Thus, the top or end of the conduit will tend to become locked or wedged in the upper end of the cavity. This has the advantage that the electrician can regulate the degree of interlock—the harder he pushes down, the tighter the interlock and vice versa.

Also, I have shown the slides and slots extending the full length of the cap, but it should be understood that they may be partial, for example the top half. The same is true of the ribs 46.

The form of the invention shown in FIGURES 1 through 5 is preferred since it is the easiest to mold, the most reliable in use and has the most advantages. But the forms in FIGURES 6 through 10 have use in certain applications.

The FIGURES 7 through 10 form has the advantage that the top or end wall 92 may be removed so that the unit can be pushed down below the top of the upstanding conduit. Thus, the unit might function purely as a spacer. This same approach could be applied to the FIGURES 1 through 5 form.

The dihedral or base circle tangent disposition of the internal ribs or flats is important since the unit will accommodate various sizes of conduit, since the ribs deflect. This is true of variations of O.D. in conduit within a nominal size, for either thick wall rigid conduit or electrical metallic tubing. Also, the unit is easy to position on the conduit and the ribs, in effect, provide a floating mounting. But at the same time the interlock, due to the friction from the deflected ribs increasing as the cover is pushed farther onto the conduit, prevents the cover from being inadvertently removed. The bottoms of the slides and slots have been referred to as bevelled, as at 41 and 43. But the tops and bottoms of the slots and slides could be bevelled, rounded or flared for this purpose, or a combination might be used.

The rib angle, meaning the angle to a radial, has been shown at approximately 45°; however, this may vary somewhat. Substantially smaller angles approaching a radius will result in excessive installation forces. Substantially greater angles will cause excessive rib length. A rib angle of approximately 45° has the advantage of providing a minimum contact surface area of a certain amount between the ribs and the outside of the conduit.

In addition, the ribs also prevent the cap from cracking when it is subject to rather wide ambient temperature swings. For example, the cap might be used in climates where it is subject to 0° temperatures in winter and 90° temperatures in summer. If the cap is made of plastic or similar material, the coefficient of thermal expansion will be greater for the cap than it will be for the metal of the conduit. Thus, the floating mounting allows for substantial expansion and contraction without causing the sides of the cap to crack.

The ribs also have the advantage that they will allow the device to be slipped around standard bends after the closure has been punched out. Thus, even though a section of conduit may have a bend in it, it still may be spaced and supported with this device.

Further, the ribs make installation and removal of the cap much easier since there are no close tolerances which require careful alignment to avoid binding due to cocking. Also, if the conduit end becomes deformed during installation, the ribs will still allow the cap to be used, within certain limits.

It should also be noted that greater spacing can be obtained by cutting the slide portion from one cap and using it as an interconnector between the slot portions of two other caps. By providing separate slide portions which could be cut to any desired length, the center-to-center spacing could be quite variable.

It is believed that this cap will have much greater reuse life due to the resiliency of the ribs which enables the ribs to recover their original shape after use.

The foregoing invention can now be practiced, and such practitioners will know that the invention is not necessarily restricted to the particular embodiments presented herein. The scope of the invention is to be defined by the terms of the following claims as given meaning by the preceding description.

I claim:

1. A unit adapted to position conduits by being mounted over the end thereof which includes a body section with a passageway in it to receive an end of the conduit, a first set of external locking configurations on the body section to permit the unit to be interconnected to a like unit on an adjacent conduit, the said first set including two configurations approximately 180° apart on opposite sides of the body section, one of the configurations having a repeating pattern of locking slots, the other having a repeating pattern of locking slides dimensioned to register with locking slots on an adjacent unit, a second set of external locking configurations disposed about 90° from the first set and including a single slide on one side and a single matching slot on the other side, all of the external locking configurations being integrally formed on the body section and arranged so that one unit may be locked to at least two adjacent units which are about 90° apart, the interlocking to one being at a selected spacial distance, and the interlocking to the other at a fixed spacial distance.

References Cited

UNITED STATES PATENTS 3,160,175   12/1964   Laemmle _____ 138—96
2,144,716   1/1939    Durofchalk _____ 24—257

FOREIGN PATENTS 1,157,436   11/1963   Germany.

J. SPENCER OVERHOLSER, *Primary Examiner.*

U.S. Cl. X.R.

24—206, 257; 249—205; 269—288